L. C. WETZEL.
WEIGHING AND COMPUTING SCALE.
APPLICATION FILED JULY 12, 1909.
1,068,616.
Patented July 29, 1913.
5 SHEETS—SHEET 4.
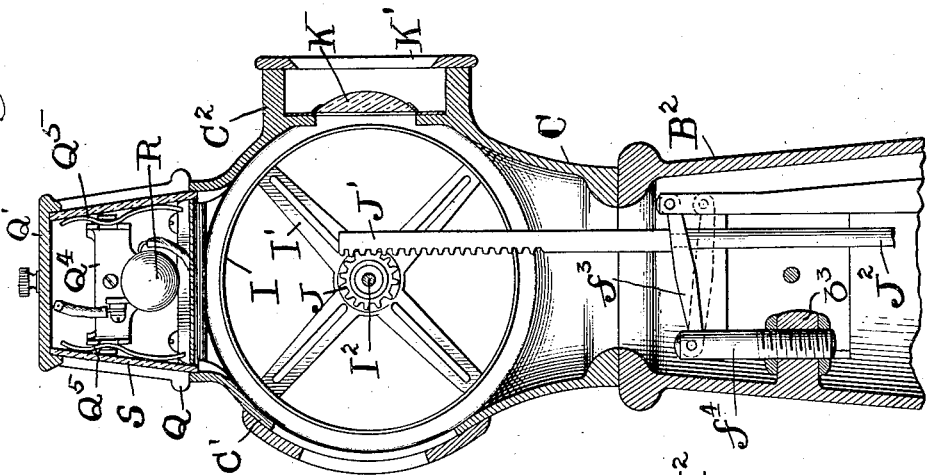
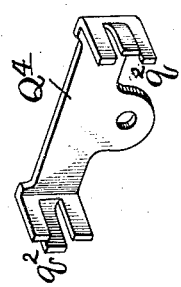
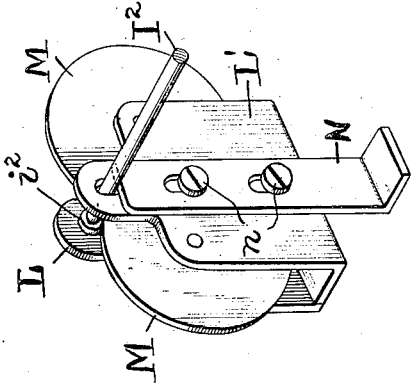
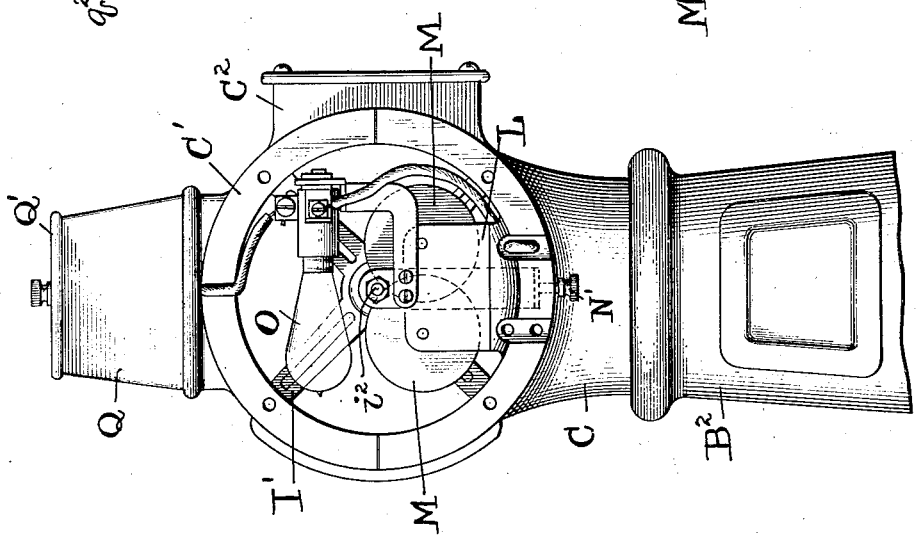
Witnesses:
Harold G. Barrett
Louis B. Erwin
Inventor:
Lewis C. Wetzel
by Rector Hibben & Davis
his Attys

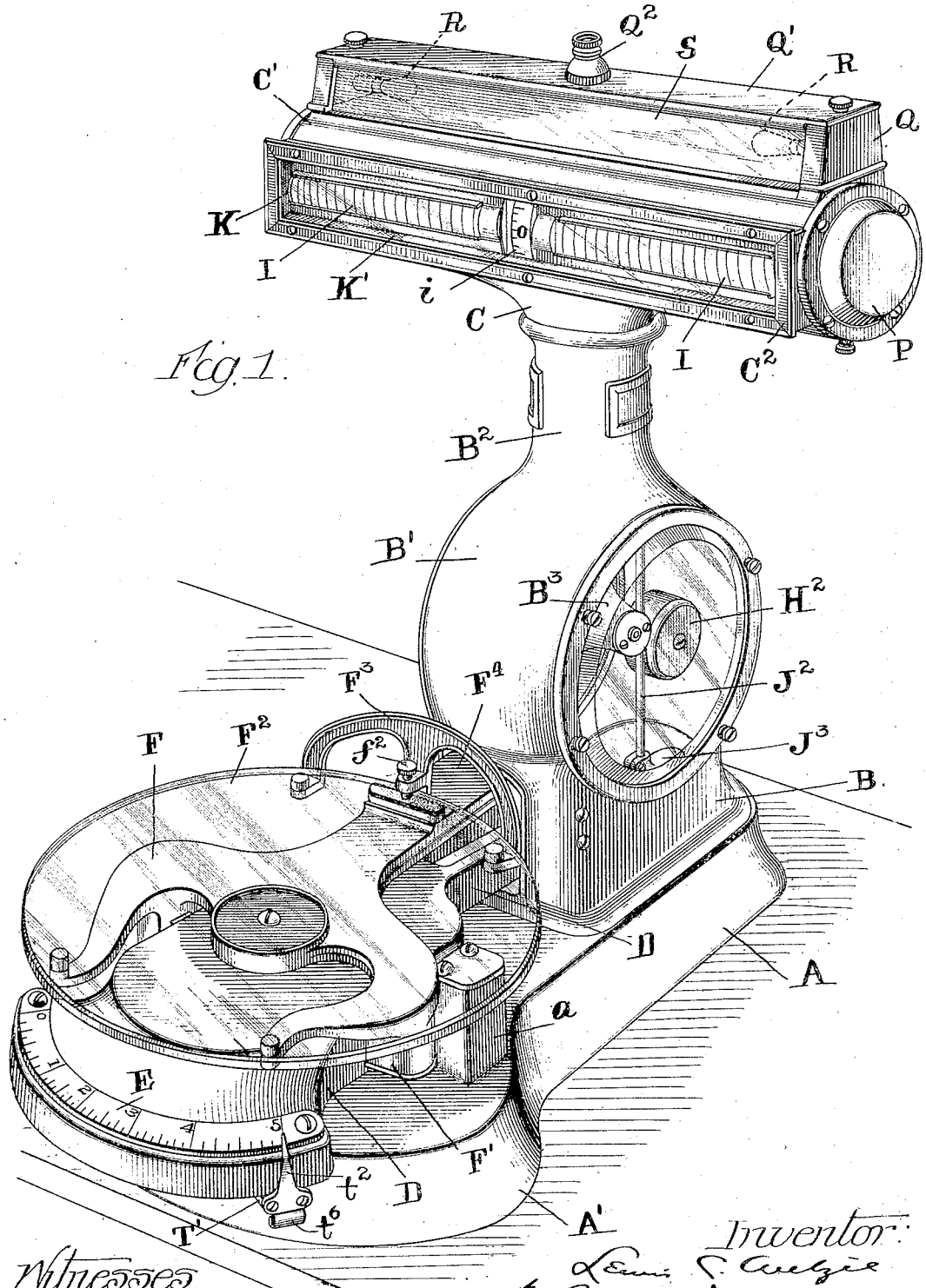

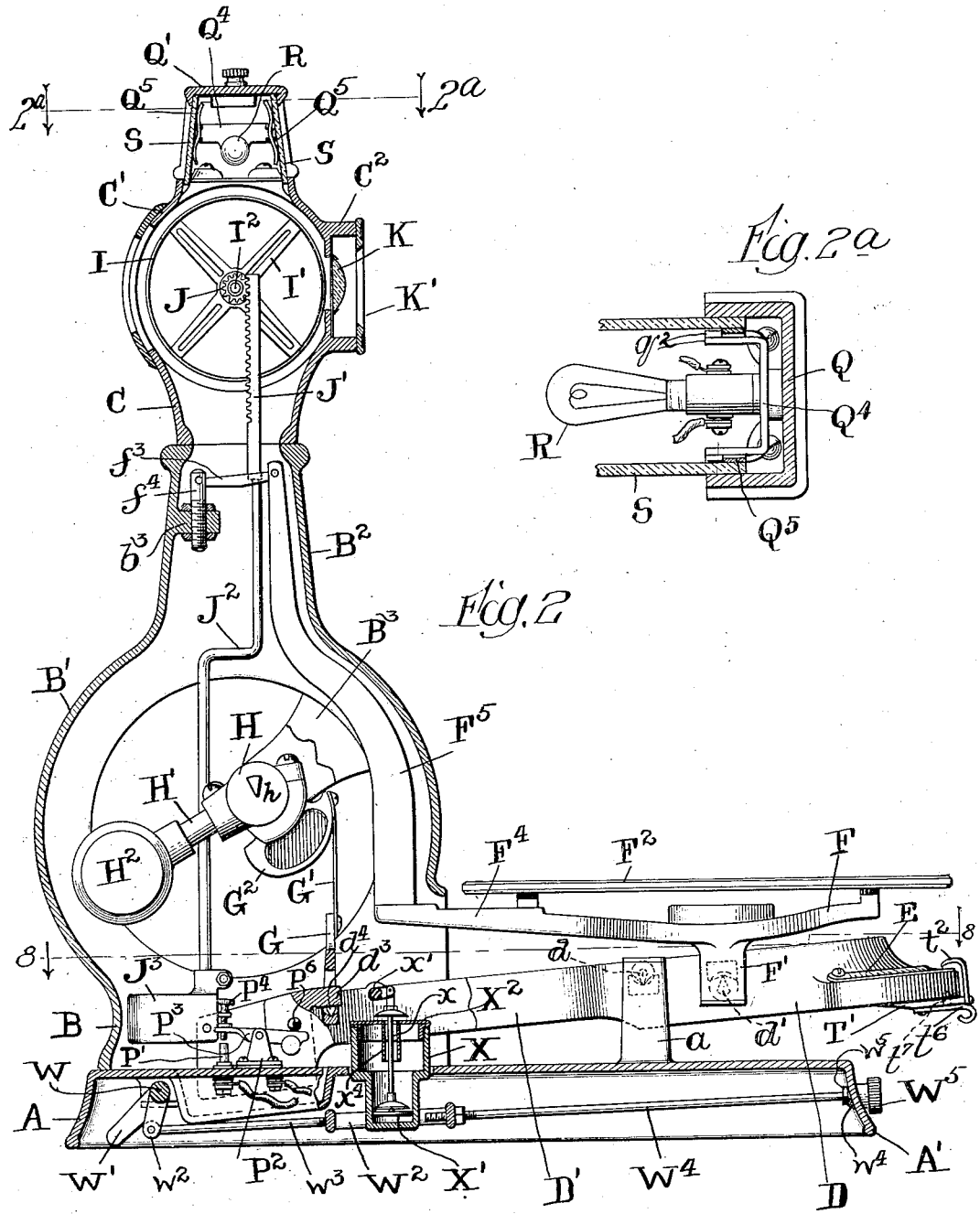

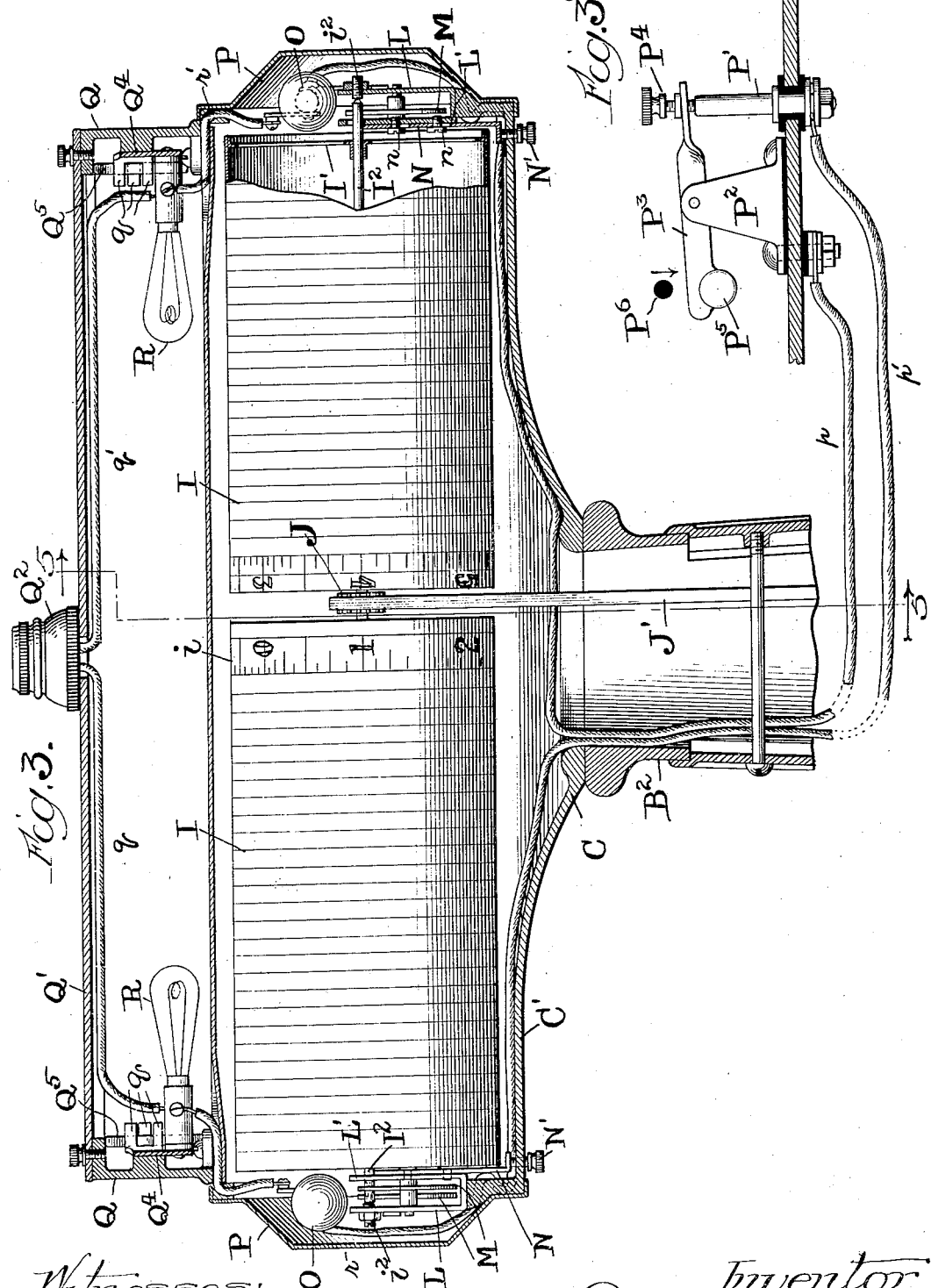

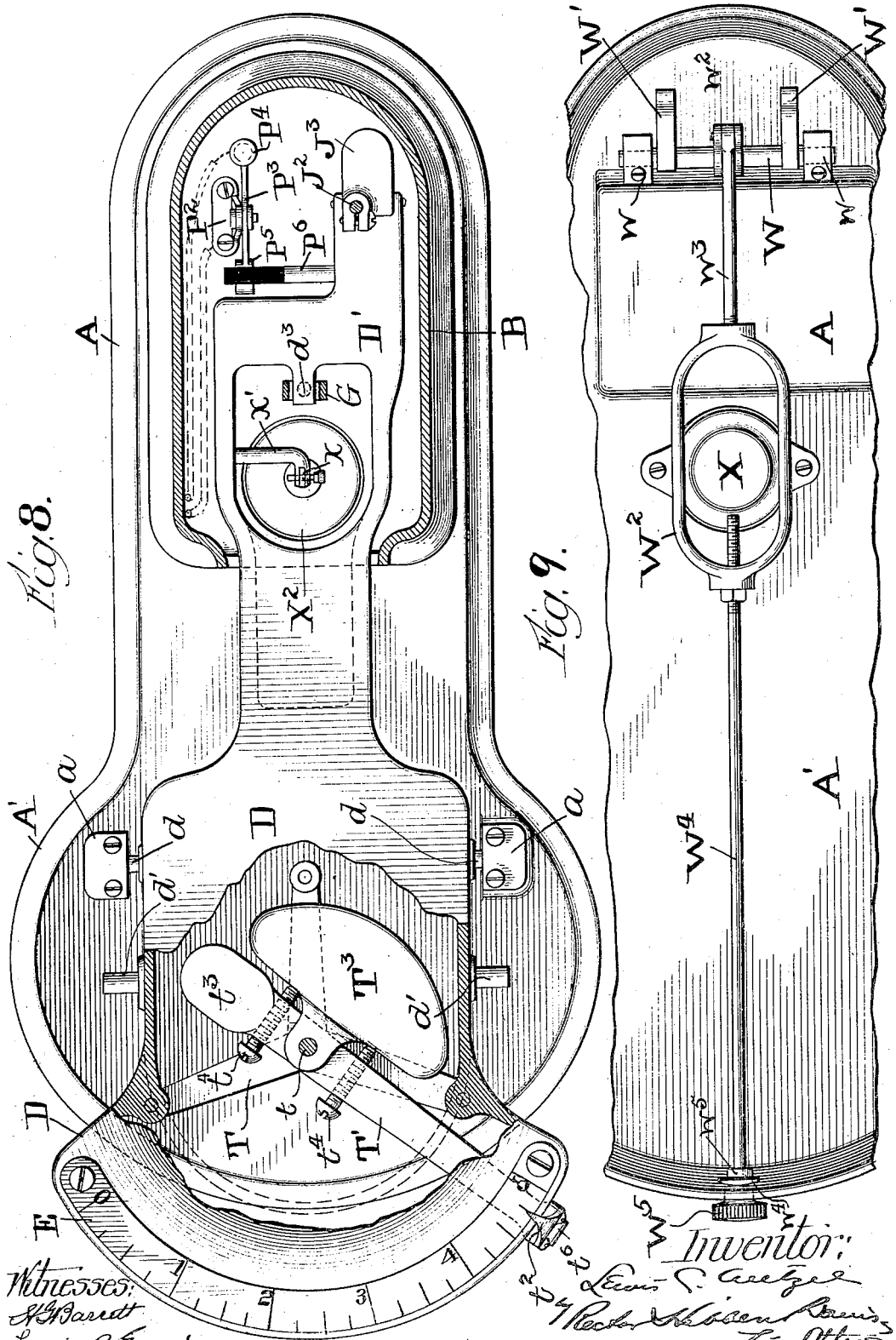

UNITED STATES PATENT OFFICE.

LEWIS CALVIN WETZEL, OF TOLEDO, OHIO, ASSIGNOR TO TOLEDO SCALE COMPANY, OF TOLEDO, OHIO, A CORPORATION OF NEW JERSEY.

WEIGHING AND COMPUTING SCALE.

1,068,616.      Specification of Letters Patent.      Patented July 29, 1913.

Application filed July 12, 1909. Serial No. 507,162.

*To all whom it may concern:*

Be it known that I, LEWIS C. WETZEL, residing at Toledo, in the county of Lucas and State of Ohio, have invented certain new and useful Improvements in Weighing and Computing Scales, of which the following is a specification.

The principal object of the present invention is to provide improved means in a weighing and computing scale for automatically illuminating the chart or table which bears weight and price numerals and marks, whenever goods are placed on the scale; also providing for the flashing of advertising matter or the like arranged as an adjunct to the scale.

In the accompanying drawings Figure 1 shows the complete scale in perspective; Fig. 2 is a vertical longitudinal section; Fig. 2$^a$ is a detail section on line 2$^a$—2$^a$ of Fig. 2; Fig. 3 is a cross section of the upper part of the scale; Fig. 3$^a$ a continuation of Fig. 3; Fig. 4 an end elevation of this upper part of the scale with a cap removed; Fig. 5 is a vertical section of this upper part of the scale; Fig. 6 is a detail perspective; Fig. 7 is a perspective of certain bearings; Fig. 8 is a horizontal section on line 8—8 of Fig. 2 with some parts broken away; and Fig. 9 is a fragmentary bottom plan view of the scale.

The scale rests upon a hollow cast iron base comprising an elongated, rather narrow, portion A and a widened oval portion A'. The latter may be considered the front portion of the base because it is over this portion that the goods receiver is located. There is erected upon the rear portion of the base a hollow cast iron column comprising a lower part B substantially rectangular in cross section, a middle portion B' of partly spherical form, and a reduced tubular upper portion B$^2$. The latter supports the short stem C of a transverse cylindrical housing C' within which the indicator is mounted. This arrangement of a supporting framework provides for the scale resting upon a counter without occupying a great deal of lateral space thereon and at the same time provides for ample capacity in the matter of indicating weights and values, as the cylindrical casing can be made as long as desired without taking counter space.

Upon the forward widened portion of the base there is a pair of standards $a$ which contain bearing blocks as indicated by dotted lines in Fig. 2 for fulcruming the main beam or lever. The latter comprises a wide forward portion D in the form of a hollow inverted casting from the sides of which project knife edge bearings $d$ to rest upon said blocks in the standards $a$. This wide portion of the beam extends forward so as to overhang the oval portion A' of the supporting base and the beam broadens as it so extends, taking on a somewhat fan-like shape as clearly shown in Fig. 1, there being applied to its upper side an arc-shaped tare scale plate E for use in connection with devices hereinafter described for taking out tare or increasing the capacity of the scales. Said wide portion of the beam has another pair of laterally projecting knife edge bearings $d'$ located forward of the projections $d$ and reversed with relation thereto so as to provide for bearing blocks $f$ resting thereon, such blocks being mounted in legs F' of a spider F supporting a platter F$^2$ which may be held in place by a set screw $f^2$ entered through an ear of a bracket F$^3$ rising from the spider F. The latter has an arm F$^4$ extending rearwardly through an opening in the lower portion B of the supporting column heretofore described, said arm F$^4$ having on the interior of such column an upward extension F$^5$, Fig. 2, which at its upper extremity is pivotally connected to a link $f^3$, the latter pivoted to a post $f^4$ adjustably mounted in an interior lug $b^3$ of the column through screw threads and nuts as illustrated in Fig. 2.

The last described arrangement provides for maintaining the level of the disk or platter F$^2$ during vibration of the beam, the link $f^3$ corresponding in length with the distance between the fulcrum of the beam and the fulcrum of the platter support. The location of the link at an elevated point in the column, instead of below the platter support and within the hollow base, has the advantage of permitting the platter to occupy a lower position.

The portion of the main beam or lever extending inwardly beyond the fulcrum is in the form of a somewhat weighty arm D' which extends through the front opening in the aforesaid column and has therein a lug $d^3$ with a point bearing $d^4$ on its under side engaging a stirrup G extended from the lower end of a flexible steel strap G', the latter secured to an eccentric disk G² suitably fulcrumed in a bracket B³ within the central portion of the column or housing. Said disk is secured, preferably with means of adjustment, to a rock shaft H having knife edge bearings $h$ resting in suitable blocks supported by the bracket B³. There projects from said rock shaft a short rod or stem H' carrying a weight H², the two constituting a pendulum which is normally elevated as shown in Fig. 2, the weight of the inner arm of the scale beam or lever being sufficient to so elevate the pendulum besides normally elevating the goods receiver. It will be obvious that weight placed upon the platter F² will act in opposition to the weighted inner arm of the beam and, the parts being normally in equilibrium, the effect of applying weight upon said platter will be to elevate the inner arm of the beam, thereby permitting the pendulum to drop, but as the latter loses leverage in dropping, the parts again assume equilibrium with the inner end of the beam more or less elevated and the pendulum more or less pendent, according to the amount of weight placed upon the platter.

The indicating mechanism here shown is in the form of a pair of drums or cylinders I journaled in the cylindrical casing C before mentioned. Each of these drums or cylinders comprises a light translucent shell and spiders I' secured to a central arbor I². The latter carries fixed to it at a point between the two cylinders, as shown in Fig. 3, a small gear pinion J which is engaged by a rack J' in the form of a bar surmounting the upper end of a bent rod J², the latter at its lower end secured to a weight J³ pivotally mounted on the inner extremity of the main beam or lever. Said weight preponderates to the rear of the pivotal mounting thereof so as to yieldingly hold the rack J' in mesh with the pinion J, thus insuring close engagement without binding.

It will be obvious that the above described indicating construction provides for turning of the drums or cylinders by vibration of the main beam or lever. One of the drums or cylinders—the left-hand one in Fig. 3—is here shown as enough longer than the right-hand drum or cylinder to provide a peripheral portion located centrally of the scale and on this peripheral portion of said left-hand drum or cylinder is inscribed a weight scale $i$ adapted to show at all times through an opening in the front of the casing. The adjacent peripheral portion of the other drum is similarly inscribed, though with the numerals reversely arranged, and shows through an opening in the back of the casing. The balance of the peripheral surface of each drum is inscribed with rows of computation numerals and graduations and the casing C is open all the way across at the front to expose the cylinders in a limited circumferential area from end to end. Preferably magnifying glasses K, Fig. 2, extend across the casing so as to magnify the exposed series of computation numerals, such numerals being somewhat small owing to the desirability of finely graduating the cylinders to provide a great range of values. The cylinder C at the front is made with a box-like forward projection C² extending from side to side, closed at the front by a glass K', this arrangement giving the indicating part of the scales a finished appearance and suitably protecting the interior mechanism while affording an unobstructed view of the exposed portions of the drums or cylinders. Ranging along the upper or lower or both sides of the longitudinal openings through which the computations are visible will be scales of price numerals located to correspond with the circumferential series of graduations and numerals on the drums. The shaft or arbor I² to which said indicating drums are secured is pointed at each end to engage thrust bearings in the form of screws $i^2$ supported in the outer uprights L of brackets secured to the casing, all as shown in Fig. 3. The shaft rests at each end in the bite of disks M loosely mounted between the outer and inner uprights L and L' of the said brackets. To guard against damage to the shaft in shipment provision is made for holding it out of contact with said disks. Thus upon the inner side of each of the bracket uprights L' there is adjustably mounted a plate N whose upper end extends under the shaft or arbor and whose lower end is flanged for the engagement therewith of a screw N' entered through the underside of the casing. The plates are slotted to embrace guiding screws $n$ secured in the bracket and it will be obvious that by turning up the screws N' the plates can be raised so as to lift the shaft from contact with the disks M. When the scale is set up of course the screws will be withdrawn so that the shaft will rest properly in the bites of the disks.

Coming now to the matter of illumination, to which the invention chiefly relates, the aforesaid brackets which support the bearings for the cylinder arbor also support incandescent electric lamps O, one at each end and located to shine into the open ends of the cylinders or drums as clearly illustrated in Figs. 3 and 4. Suitable caps P applied to the ends of the cylindrical casing cover the cylinder journals and said lamps. Current is automatically turned on by the operation of the scales and to this end the lamps are wired to posts P' and P² on the base of the scales as shown in Figs. 2 and 3ª, the connecting wires between the said posts and the said lamps being designated by reference letters $p$, $p'$. In the post $P^2$ there is pivotally mounted a switch lever $P^3$ carrying on one side of its pivot a contact screw $P^4$ and on the opposite side of its pivot a weight $P^5$, the idea being to have the arm on the contact side barely overbalance the weighted arm so that the amount of force necessary to break the connection will be negligible. The scale beam or lever carries at its inner end a stud or pin $P^6$ of suitable insulating material or suitably insulated, which stud or pin extends over the weighted end of said lever $P^3$ and normally engages the same as shown in Fig. 2, separating the screw $P^4$ from contact with the post $P'$. Any weight placed upon the platter $F^2$ will cause sufficient movement of the beam to raise the pin $P^6$ as shown in Fig. 3$^a$ and permit the contact to be made, thereby causing illumination of the translucent drums, which will continue until the article or goods being weighed and valued are removed. This of course enhances the clearness of the indications of weight and values, making them easier to read and mistakes less likely to occur, besides permitting the use of smaller and more closely assembled markings on the chart and hence greater capacity in a given area for computing.

On top of the housing or casing for the said drums or cylinders there is a casing comprising end pieces Q and a detachable top plate $Q'$. The latter carries a socket $Q^2$ for an electrical connection, said socket being connected by wires $q$, $q'$ to lamps R carried by the end pieces Q, said lamps being wired in series or in multiple with the lamps O. Wires $r$, $r'$ are shown in the present instance connecting said lamps R in series with lamps O. Secured to the end pieces Q are brackets $Q^4$ having inwardly pointed staggered fingers $q^2$ for holding spring clips $Q^5$. The end pieces Q are suitably formed to receive removable glass plates S which will be held in place by said spring clips shown in Fig. 5. These plates may be used to display advertising matter which will be momentarily illuminated whenever the scale is operated by reason of the closing of the circuit through the lamps R. The manner of mounting the plates as above described provides for interchanging plates to vary the display at will.

Referring next to devices for taking out tare or increasing the weighing capacity of the scale, there is secured on the under side of the widened portion of the scale beam, see Fig. 8, a spider T between which and the beam extends a journal post $t$. An arm or lever $T'$ is journaled upon this post and extends forwardly under the beam to a point in front of the same where it carries an index finger $t^2$ projecting up and over the tare scale E. Said arm or lever also extends on the other side of its journal or pivot, though not to the same extent. However, it is weighted on the inner side of the pivot as indicated at $t^3$ so as to counterbalance the longer arm and prevent any change of equilibrium in the scale due to the swinging of this arm or lever itself. The swinging of the latter does, however, affect the equilibrium of the scale by changing the position of a weight $T^3$ journaled on the post $t$ and engaged on opposite sides of the latter by adjusting screws $t^4$ entered through the lever $T'$. When the said lever is at normal or in position with the pointer $t^2$ registering with the zero mark on the scale, the weight $T^3$ is so disposed as to secure a normal equilibrium of the entire apparatus so that any weight placed upon the platter $F^2$ will move the beam and connected parts. However, swinging of the lever $T'$ from such normal position will carry the mass of the weight $T^3$ toward the inner end of the beam, thus permitting the latter to overbalance the outer end and parts mounted thereon. Hence a certain amount of weight will be required on the platter before the beam will move. Of course the weight $T^3$ is so proportioned and adjusted as to make the scale E properly register the exact amount of weight required on the platter before the beam will move. This construction provides convenient means for taking out tare as by first placing a receptacle on the platter and noting its weight on the drum scale and then moving the pointer $t^2$ to the corresponding graduation on the tare scale E which of course brings the drum scale back to zero. These devices may also be utilized to double the capacity of the scale, as by throwing the lever $T'$ to the extreme right-hand position where its pointer registers with the graduation representing five pounds. Then of course the beam will not move until five pounds of weight has been placed upon the platter or unless the amount of weight placed at one time upon the platter exceeds five pounds. It is evident that weight in excess of five pounds will be indicated upon the drum scale and to arrive at the total weight of the commodity it is only necessary to mentally add the five pounds and the weight indicated by the drum scale.

In order to prevent the lever $T'$ from being accidentally moved out of normal position or from the five pound position a spring clip $t^6$ is fastened to the under side of the lever and carries a projection $t^7$ adapted to engage depressions in the under side of the beam.

Convenient means are provided for leveling the scale, it being understood that this is important particularly in a scale of the pendulum type. In the hollow base of the scales as illustrated in Fig. 9, near the rear end thereof, suitable bearings $w$ are provided for a rock shaft W, the latter carrying a pair of arms W′, see also Fig. 2. These arms are adapted to bear upon the surface on which the scale rests and it will be obvious that by rocking the shaft W the rear end of the scale can be raised or lowered to level the apparatus with reference to the plane in which the pendulum swings. A bifurcated arm $w^2$ also secured to the rock shaft W has pivotally connected to it a rod $w^3$ screwed into a yoke $w^2$ and another rod $W^4$ is screwed into the opposite end of said yoke and extends loosely through a boss on the front end of the base as shown at $w^4$. On the front end of said rod $W^4$ is secured a knob $W^5$. A small collar $w^5$ is secured to the rod $W^4$ and bears against the boss $w^4$ and it will be obvious that turning the knob $W^5$ will result in moving the yoke $W^2$ and rod $w^3$ longitudinally one way or the other and thus rocking the shaft W to properly adjust the arms W′.

It is desirable, if not practically essential, in apparatus of the kind described to provide some form of means for moderating the vibrations of the parts so that they will come to rest quickly. In the present instance a dash-pot cylinder X is mounted in an opening of the base as shown in Fig. 2 and a piston X′ within said cylinder is connected by a rod $x$ to an arm $x'$ projecting from one side of the opening in the inner arm D′ of the beam as clearly shown in Fig. 8; see also Fig. 2. A cap $X^2$ is screwed into the top of the cylinder but packing around the piston rod is not necessary because the cylinder is made of larger diameter at the top than the bottom and the cap has a tubular portion $x^4$ surrounding the rod and extending inwardly far enough to prevent escape of contents of the cylinder when in shipment the scale might be turned on its side or inverted.

What I claim is:

1. In a weighing scale, the combination of a main beam pivoted intermediate its ends and carrying a load-receiver on one side of the pivot; load-counterbalancing and indicating means connected to said beam on the other side of its pivot; a counterbalanced circuit-closing lever normally held open by the weight of the arm of said beam to which said counterbalancing and indicating means are connected; and an electric lamp for illuminating the indicating means upon the rise of said arm of the beam and the consequent movement of the circuit-closing lever to closing position, the beam having an insulated pin normally restraining the circuit-closing lever.

2. In a weighing scale, the combination of a main beam pivoted intermediate its ends and carrying a load-receiver on one side of the pivot, and being overweighted on the opposite side of the pivot; a pendulum operatively connected to the overweighted arm of the beam and normally elevated thereby; an indicator connected to such arm of the beam; an electric lamp for illuminating said indicator; and a counterbalanced circuit-closing lever normally restrained by the overweighted arm of the beam.

3. In a weighing scale, the combination of a main beam pivoted intermediate its ends and carrying a load receiver on one side of the pivot, and being overweighted on the opposite side of the pivot; a pendulum operatively connected to the overweighted arm of the beam and normally elevated thereby; an indicator connected to such arm of the beam; a lamp circuit; and a circuit-closer normally held to open position by the overweighted arm of the beam.

4. In a weighing scale, the combination of a main beam pivoted intermediate its ends and carrying a load-receiver on one side of the pivot; and being overweighted on the opposite side of the pivot; a pendulum operatively connected to the overweighted arm of the beam and normally elevated thereby; an indicator connected to such arm of the beam; a lamp circuit; and a counterbalanced circuit-closing lever normally held to open position by said overweighted arm of the beam.

5. In a weighing scale, the combination of a suitable base; a scale beam mounted thereon and supporting a goods-receiver; a housing erected on the base; load counterbalancing and indicating means arranged in said housing and connected to the beam; a box-like superstructure on the housing and having transparencies in its sides; one or more electric lamps in said superstructure; and a lamp circuit controlled by the scale beam.

6. In a weighing scale, the combination of a suitable base; a scale beam mounted thereon and supporting a goods-receiver; a housing erected on the base; load-counterbalancing and indicating means arranged in said housing and connected to the beam; a box-like superstructure on the housing and having transparencies in its sides; one or more electric lamps in said superstructure; one or more electric lamps in the housing adjacent the indicating means; and a lamp circuit controlled by the scale beam.

7. In a weighing scale, the combination of a main beam pivoted intermediate its end and carrying a load receiver on one side of the pivot and overweighted on the opposite side of the pivot, a pendulum operatively connected to the overweighted arm of the beam and normally elevated thereby, an indicator connected to such arm of the beam, a lamp circuit, a counterbalanced circuit-closing lever normally held to open position by said overweighted arm of the beam, a contact with which the lever engages to close the circuit and an adjustment for regulating the extent of movement of the circuit-closing lever.

8. In a device of the class described, a housing Q' having openings in the sides thereof, panes closing such openings, brackets Q⁴ secured to the ends of the housing and having the fingers q and springs Q⁵ held by said fingers and engaging the panes in the housing.

9. In a weighing scale, a beam having a scale pan at one end and weight at the other, indicating means, a lamp arranged to illuminate the indicating means, a circuit for the lamp including a delicately balanced normally closed switch lever mounted in juxtaposition to the weighted end of the beam, and means on the beam for swinging the lever to open the switch as said beam returns to normal position.

10. In a scale and in combination with the beam thereof, a rotary indicating cylinder, connections for rotating the latter from the beam, a casing including the indicating cylinder, stationary bearings in the casing in which the shaft of the indicating cylinder rests, and means for raising the shaft away from its bearings for shipment.

11. In a scale and in combination with the beam thereof, a rotary indicating cylinder, connections for rotating the latter from the beam, a casing including the rotary indicator, stationary bearings in the casing in which the shaft of the indicator rests, and plates N beneath the shaft and adjustable toward the latter to raise it from its bearings for shipment.

12. In a scale and in combination with the beam thereof, a rotary indicating cylinder, connections for rotating the latter from the beam, a casing including the rotary indicator, bearings in the casing in which the shaft of the indicator rests, and plates N beneath the shaft and adjustable toward and from the same and screws for adjusting the plates.

13. In a weighing scale having a hollow base, a rock shaft extending transversely thereof near one end, arms on the rock shaft of substantially equal length adapted to bear against a suitable support for the base, other arms on the rock shaft, a yoked rod pivoted to the last named arms, a threaded rod extending from the other end of the base and tapped into the yoke for the purpose of adjusting the rock shaft.

14. In a weighing scale, a hollow beam, a lever T' pivoted within the beam, a weight T³ mounted upon the same pivot as the lever, screws T⁴ tapped through the lever and engaging the weight upon opposite sides of the pivot, a tare scale E and a pointer T² upon the lever coöperating with the tare scale.

LEWIS CALVIN WETZEL.

Witnesses:
M. L. Thompson,
E. J. Sheffer.